United States Patent
Fisher et al.

(10) Patent No.: US 8,317,413 B2
(45) Date of Patent: Nov. 27, 2012

(54) PACKAGING FOR FUSED FIBER DEVICES FOR HIGH POWER APPLICATIONS

(75) Inventors: Norman Edward Fisher, Torquay (GB); Toby Woodbridge, Paignton (GB); Andrew Richard Rider, Torquay (GB)

(73) Assignee: Gooch and Hoosego PLC, Somerset (GB)

( * ) Notice: Subject to any disclaimer, the term of this patent is extended or adjusted under 35 U.S.C. 154(b) by 746 days.

(21) Appl. No.: 12/277,484

(22) Filed: Nov. 25, 2008

(65) Prior Publication Data

US 2010/0129042 A1    May 27, 2010

(51) Int. Cl.
*G02B 6/255* (2006.01)
(52) U.S. Cl. .......................................... 385/99
(58) Field of Classification Search ............ 385/99
See application file for complete search history.

(56) References Cited

U.S. PATENT DOCUMENTS

| | | | | |
|---|---|---|---|---|
| 5,175,776 A | * | 12/1992 | Lee | 385/16 |
| 5,271,079 A | * | 12/1993 | Levinson | 385/46 |
| 5,384,878 A | * | 1/1995 | Osaka et al. | 385/96 |
| 5,457,765 A | * | 10/1995 | Suzuki et al. | 385/137 |
| 5,682,453 A | * | 10/1997 | Daniel et al. | 385/99 |
| 5,745,626 A | * | 4/1998 | Duck et al. | 385/96 |
| 5,848,208 A | * | 12/1998 | Suzuki et al. | 385/43 |
| 7,373,070 B2 | | 5/2008 | Wetter et al. | |
| 2004/0202434 A1 | * | 10/2004 | Tomita et al. | 385/92 |

FOREIGN PATENT DOCUMENTS

| | | |
|---|---|---|
| EP | 0607990 A1 | 7/1994 |
| WO | 9531742 | 11/1995 |
| WO | 0248770 | 6/2002 |

OTHER PUBLICATIONS

Hyungu IM, et al., "Metal-oxide-containing polysiloxane enables enhanced conductivity", Society of Plastics Engineers, Plastics Research Online, 2010, pp. 1-4.

* cited by examiner

*Primary Examiner* — Uyen Chau N Le
*Assistant Examiner* — Hoang Tran
(74) *Attorney, Agent, or Firm* — Jetter & Associates, P.A.

(57) ABSTRACT

A packaged fused-fiber device includes a fused-fiber device having at least one input fiber and at least one output fiber, and a fused portion between the input fiber and output fiber. A concave shaped substrate has an inside surface and an outside surface, wherein a minimum distance from the inside surface to the outside surface that is generally set by the substrate thickness is substantially constant throughout the substrate. An affixment material secures the first and second ends of the fused portion to the inside surface of the substrate. A thermally conductive housing is in thermal contact with the outside surface of the substrate. In one embodiment the substrate has an L-shaped cross section and the housing is a hollow housing that has a rectangular cross section.

18 Claims, 2 Drawing Sheets

PACKAGING FOR FUSED FIBER DEVICES FOR HIGH POWER APPLICATIONS

FIELD

This invention relates to packaged fused fiber devices and more specifically packaged fused fiber devices having substrate configurations for enhanced cooling.

BACKGROUND

Most fiber optic components, such as fused-fiber devices, are fragile components and need to be protected from environmental influences and other abuses both during use and during production. In particular, fused-fiber devices are formed by fusing and tapering two or more optical fibers together. Generally, fiber optic components, and in particular fused-fiber devices, are sensitive to environmental influences because the optical material of which the optical fibers are made is very fragile. In the case of fused-fiber devices, the fused region is particularly sensitive to adverse environments which can influence the quality of the optical material of the fused-fiber device and/or the signals transmitted through the fused-fiber device.

In operation of the fused-fiber device a portion of the optical power launched into the device is unavoidably converted into heat because of internal leakage of light power into its packaging through optical loss. For high optical power applications, the resulting temperature rise caused by power loss can cause internal heating of the packaged device sufficient to degrade the packaging and/or compromise the performance of the device. Heat generated within the device conducts to the exterior of the package and dissipates to the environment generally by an external heat sink to which the package exterior is in thermal contact and, in some arrangements, aided by forced air convection or coolant fluid, such as in an active cooling loop.

There is an increasing demand for fused-fiber devices whose packaging is more efficient at conducting internally generated heat to the external heat sink and thus are reliably able to transmit higher optical powers. Both power handling and reliability are generally significantly affected by the packaging of the device. Packaged fused-fiber devices are commonly produced with housings of circular or rectangular profile. Inside the housing is generally a substrate upon which a suitable affixment material is applied on or proximate to the fused portion on both sides of the fused portion. It is generally within this affixment material that optical loss from the fiber first appears as heat. The substrate conventionally has a D-shaped or slab-shaped geometry, and may have a slotted region in which to locate the fused portion of the device. The substrate material is generally selected for mechanical strength and for an expansion coefficient matched to that of the optical fiber material (e.g. silica). As a result the substrate material may not provide optimum thermal conductivity.

Slotted substrates provide convenient protection of the fused portion of the device during production. However, slotted thin substrates have increased thermal stressing of the slot resulting from thermal coefficient mismatch between the affixment and the substrate materials. Due to the resulting potential for fracture of the substrate proximate to the slot under conditions of temperature cycling or significant internal generation of heat, slotted thin substrates may be unsuitable for applications involving high optical power where long term reliability is needed.

D-shaped substrates for circular housings and the related slab-shaped substrate for rectangular housings provide alternative packaging configurations for generally improved reliability as compared to slotted substrates.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

The Present Inventors have recognized that a significant reliability aspect in packaging designs for fused-fiber devices with thin substrates for dissipating internally generated heat is obtained by avoiding substrate slots which as noted above carry the risk of failure due to thermal stressing. The Present Inventors have further recognized that improved reliability packaging configurations such as conventional D-shaped and the related slab-shaped substrates support optical power levels which are generally limited primarily because of limited thermal conductivity between the affixment on or proximate to both ends of the fused portion of the device and the exterior of the packaging. Moreover, the Present Inventors have recognized that for fused-fiber devices to reliably transmit higher optical power levels, new packaging configurations are needed that provide improved thermal conductivity between the affixment and the exterior of the housing.

The Present Inventors have developed new concave shaped slotless substrate designs that provide a reduced distance from the inside substrate surface to the outside substrate surface that is substantially constant throughout the substrate and have a high surface area to volume ratio as a result. Embodiments of the invention include packaged fused-fiber devices that are well adapted for high power applications and the accompanying levels of optical loss that result in heating and that are passively cooled, and thus may not require active cooling due to their ability to more efficiently conduct internal heat to their external environment. However, embodiments of the invention may also be used in active cooling arrangements.

The packaged fused-fiber device comprises a fused-fiber device having at least one input fiber and at least one output fiber, and a fused portion between the input fiber and output fiber. A concave shaped substrate comprises an inside surface and an outside surface, wherein a minimum distance from the inside surface to the outside surface is substantially constant throughout the substrate. As defined herein and generally recognized a "concave shape" is a shape comprising lines or segments that form an angle between them that is less than 180 degrees, thus curving in or hollowed inward.

An affixment material, which can be thermally conductive, is applied on or is proximate to the fused portion on both sides of the fused portion to secure the first and second ends of the fused portion to the inside surface of the substrate. As used herein, "proximate" refers to outside the fused portion but within the length of the substrate and generally within the housing. The affixment can be entirely on the fused portion, entirely off the fused portion, or partially on the fused portion and partially on the unfused portion. As used herein, a "thermally conductive" material is a material that provides a thermal conductivity of at least 50 W/m·K at 25° C. A thermally-conductive housing is in thermal contact with the outside surface of the substrate. In one embodiment the substrate has an L-shaped cross-section and the housing is a hollow housing that has a rectangular cross section. Methods to form packaged fused-fiber devices according to embodiments of the invention are also disclosed.

DETAILED DESCRIPTION

Figure 1:
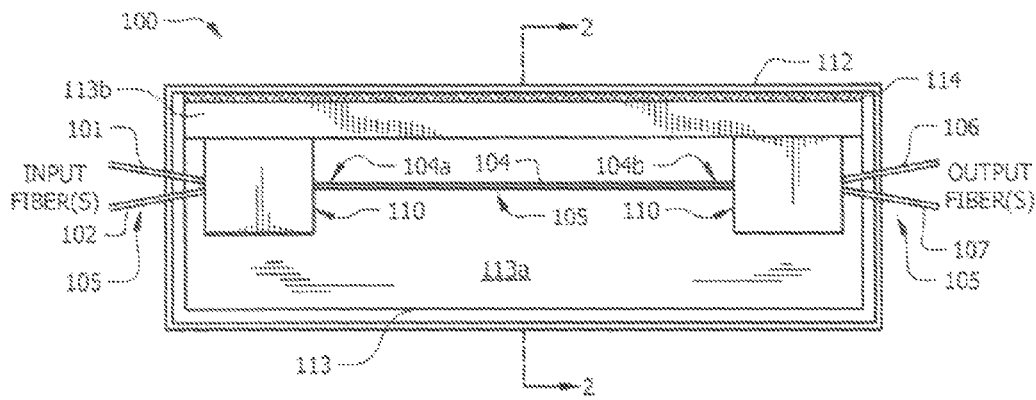
FIG. 1 is a simplified top view with the top of the package removed for viewing of a packaged fused-fiber device, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 2:
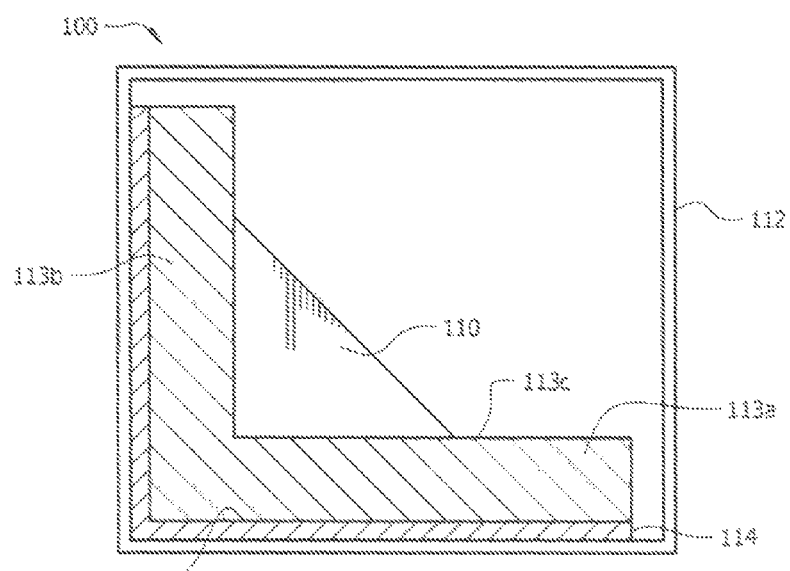
FIG. 2 is a cross sectional view of a packaged fused-fiber device that shows a concave substrate having an L-shaped cross section and a hollow housing having a rectangular cross section, according to an embodiment of the invention.

FIG. 1 is a simplified top view with the top of the package not shown for viewing a packaged fused-fiber device 100, according to an embodiment of the invention. FIG. 2 is a cross sectional view of the packaged fused-fiber device 100 that shows the concave substrate having an L-shaped cross section and a hollow housing having a rectangular cross section, according to an embodiment of the invention.

The fused-fiber device shown in FIG. 1 is a 2×2 port device, such as a fused-fiber coupler, that comprises input fibers 101 and 102 and output fibers 106 and 107, and a fused-fiber portion 104 between the input fibers and the output fibers. Fused fiber portion 104 comprises a first end 104a and a second end 104b. Fused-fiber device 105 generally comprises at least one input and at least one output, as noted above.

Packaged fused-fiber device 100 includes a concave shaped substrate 113, best shown as being concave shaped in FIG. 2 which corresponds to a cross section of substrate 113 taken along the cut line 2-2 shown in FIG. 1. Substrate 113 includes an in-plane plane portion 113a (along the plane of the page) and a portion 113b that extends in the out-of plane direction (out of the plane of the page). Substrate 113 is generally a monolithic substrate for added mechanical robustness. In addition, substrate 113 generally has planar surfaces and does not generally attempt to match the shape of the fiber as this would tend to result in a slotted topology. As seen in FIG. 2, the thickness of substrate 113 provides a minimum distance from the inside substrate surface 113c to its outside substrate surface 113d that is substantially constant throughout the substrate 113.

The thickness of substrate 113 is generally within the range from 0.8 to 1.3 mm. This thickness range is generally sufficiently thin to allow efficient thermal conduction, while generally being thick enough to be mechanically robust. This thickness can be compared to conventional slab-shaped substrates that have a thickness of about 1.3 mm and conventional D-shaped substrates that have a radius of about 1.5 mm.

As defined herein, a "substantially constant" minimum distance is a minimum distance that is generally defined by the thickness of the substrate 113 throughout that ranges no more than 30% from an average distance value. In other embodiments of the invention, the minimum distance ranges no more than 20%, such as no more than 10%, from the average distance value.

In a typical embodiment the material for substrate 113 can be fused silica due to its reliability, rigidity and thermal expansion characteristics that match conventional silica optical fiber in typical applications where the fused-fiber device 105 comprises silica. For silica optical fiber the coefficient of thermal expansion is around $5 \times 10^{-7 \circ}$ C.). However, other materials of similar optical fiber matching properties can generally be used.

An affixment material 110, which can be thermally conductive, is used for securing first end 104a and second end 104b of the fused portion 104 to the inside surface of the substrate 113c. A thermally-conductive housing 112 is in thermal contact with the outside surface of the substrate 113d, aided by thermally conductive layer 114, such as thermally conductive silicone (e.g. silicone plus silver particles). The thermal contact between the substrate 113 and housing 112 could also be provided by thermally conducting paste, tape or other adhesive. Housing 112 generally provides an enclosed volume having sealable ends (e.g. end plugs) for providing a seal which can be hermetic. The sealable ends, such as end plugs, provide protection against environmental humidity and contamination (e.g. dust). As known in the art, the housing 112 is generally configured so that the inputs and outputs of the device emerge through end-plugs to the outside world. Housing 112 generally comprises a thermally conductive material, such as aluminium or copper. The thermal conductivity of aluminum is known to be about 237 W/m·K.

Referring again to FIG. 2, a substrate 113 having an L-shaped cross section is shown along with a housing 112 having a rectangular cross section. The fused-fiber portion 104 which is embedded in the affixment material 110 is not shown in FIG. 2. The arrangement shown in FIG. 2 not only dissipates heat more efficiently than with known designs (see Examples) but also avoids the risk of poor reliability described above if slotted thin substrates were instead used.

The substrate portions 113a and 113b provide the two linear sides for substrate 113 having an L-shaped profile shown thermally contacted to two adjacent internal surfaces of hollow rectangular housing 112 using a thermally conductive material 114, such as thermally conductive silicone. As described above, substrate 113 is generally a monolithic substrate for added mechanical robustness. However, embodiments of the invention also include non-monolithic substrate arrangements. For example, two conventional slab substrates can be securely bonded together to form a concave substrate having any desired angle between slabs, such as 89 to 91 degrees in the case of the L-shaped substrate shown in FIG. 2.

The substrate portions 113a and 113b are generally substantially perpendicular to one another. "Substantially perpendicular" is defined herein as being from 75 to 105 degrees. Angles significantly less than 75 degrees, such 60 degrees or less, can begin to become susceptible to thermally induced fracture as described above that is characteristic of thin slotted substrates. In one embodiment of the invention, the angle is 90 degrees+/−0.5 degrees, such as the L-shaped substrate shown in FIG. 2.

The arrangement shown in FIG. 2 provides for minimal substrate thickness (e.g. around 1 mm) and a considerably increased contact area between the substrate 113 and both the affixment 110 and the housing 112, relative to designs using conventional slab-shaped or D-shaped substrates. As a result, the ability to transfer internally generated heat to the environment is considerably improved. Furthermore, the L-shaped substrate 113 provides a design that avoids the risk of poor reliability described above if slotted thin substrates were to be used. A rectangular housing geometry provides a large internal surface area, a large proportion of which thermally contacts the substrate 113 for the fused portion 104 of the fused-fiber device 105.

Figure 3A:
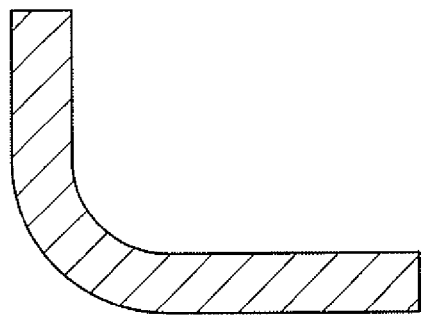
FIG. 3A-D shows some exemplary cross sectional concave substrate shapes, according to embodiments of the invention.
Figure 3B:
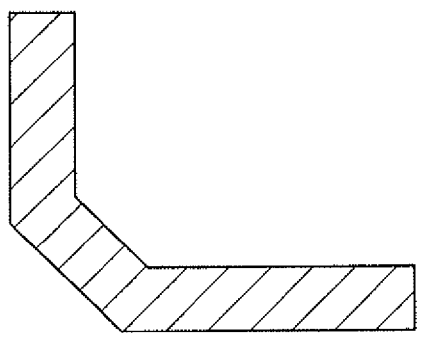
Figure 3C:
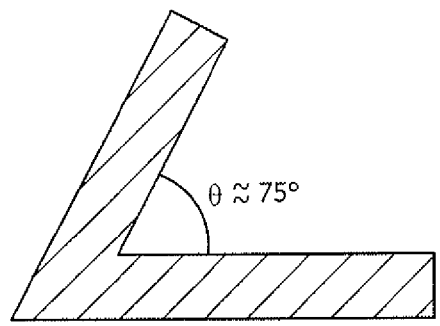
Figure 3D:
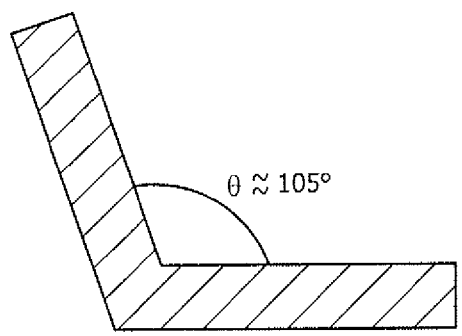

FIG. 3A-C shows some exemplary cross sectional concave substrate shapes besides L-shaped, according to embodiments of the invention. FIG. 3A shows a curved cross sectioned substrate having a C-shaped cross section which is an example of an arrangement that does not include linear sides. FIG. 3B a three sided cross section having three linear sides. FIG. 3C shows a substrate having first and second linear sides at an angle of about 75 degrees, while FIG. 3D shows a substrate having first and second linear sides at an angle of about 105 degrees.

Concave shaped substrates according to embodiments of the invention, such as L-shaped substrates, can be formed by machining solid bulk material such as silica. However, other materials or processes can be used. An L-shaped substrate is generally used since its 90 degree angle provides for the convenience of a rectangular housing preferred by customers. Angles that substantially deviate from 90 degrees are not generally used. In particular, angles less than 60 degrees are generally too slot-like to carry acceptable risk of the above reliability problems associated with thermal stressing, while angles greater than 105 degrees tend to lead to an impractical flattened device. Curved concave-shaped substrates such as in FIG. 3A, or similar, provide for the convenience of using a circular housing or rectangular housing with a circular hole.

Advantages of embodiments of the present invention include a greater capability to dissipate heat than conventional slotless substrates, such as having D- or slab-shaped profiles, and allow improvement of the thermal conduction while avoiding the above potential reliability concerns associated with slotted thin substrates described above. Good thermal conduction and high reliability make packaged fused-fiber devices according to embodiments of the invention well suited to applications requiring high optical power. For example, fused-fiber devices such as couplers, combiners, splitters, WDMs, taps and other tapered fused-fiber components can benefit from embodiments of the invention.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Heat dissipation capabilities for a packaged fused-fiber device according to an embodiment of the invention based on the packaged fused-fiber device 100 shown in FIGS. 1 and 2 (L-shaped substrate and rectangular housing) were tested to compare the cooling of a conventional packaged fused-fiber device comprising a slab-shaped substrate in a rectangular sectioned housing, when used in conjunction with a typical passive external heat sink. The performance of the respective fused-fiber devices were modelled based on thermal imaging data. The packaged fused-fiber device according to an embodiment of the invention was found to be about 2.6 times more efficient at heat dissipation as compared to the conventional packaged fused-fiber device.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A packaged fused-fiber device, comprising:
   a fused-fiber device having at least one input fiber and at least one output fiber, and a fused-fiber portion having a first and second end between said input fiber and said output fiber;
   a concave shaped substrate comprising an inside surface and an outside surface,
   wherein a minimum distance from each point on said inside surface to said outside surface is substantially constant throughout a cross-section of said substrate,
   wherein said cross-section is non-enclosing and includes an open portion along a length direction of said substrate perpendicular to ends of said substrate;

an affixment material for securing said first and said second end of said fused portion to said inside surface of said substrate, and a housing in thermal contact with said outside surface of said substrate, wherein a minimum distance from each point on said outside surface of said substrate to said housing is substantially constant throughout said cross-section of said substrate.

2. The packaged device of claim 1, wherein said substrate is a monolithic substrate.

3. The packaged device of claim 1, wherein said inside surface of said substrate consists of a first side and a second side, wherein an angle between said first side and said second side is 75 to 105 degrees.

4. The packaged device of claim 3, wherein said angle is 89 to 91 degrees, said substrate providing an L-shaped cross-section.

5. The packaged device of claim 4, wherein said housing comprises a hollow housing having a rectangular cross section.

6. The packaged device of claim 1, wherein said substrate comprises a material that provides a thermal expansion coefficient within 10% of a thermal expansion coefficient of said fused portion.

7. The packaged device of claim 1, wherein said housing provides a seal and is thermally conducting.

8. The packaged device of claim 7, wherein said housing provides a thermal conductivity of at least 50 W/m·K.

9. The packaged device of claim 8, wherein said housing comprises aluminum.

10. The packaged device of claim 1, further comprising a thermally conductive material between said outer surface of said substrate and said housing.

11. The packaged device of claim 10, wherein said thermally conducting material comprises a thermally conducting silicone.

12. The packaged device of claim 1, wherein said substrate comprises silica.

13. The packaged device of claim 1, wherein said substrate comprises a curved cross sectioned substrate.

14. The packaged device of claim 1, wherein said fused-fiber device comprises a fused-fiber combiner.

15. A packaged fused-fiber device having at least one input fiber and at least one output fiber, and a fused-fiber portion between said input fiber and said output fiber;

a concave shaped substrate having a thermal expansion coefficient matched within 10% relative to a thermal expansion coefficient of said fused portion comprising an inside surface and an outside surface, wherein a minimum distance from each point on said inside surface to said outside surface is substantially constant throughout said substrate, and wherein said concave shaped substrate consists of a first side and a second sides on said inside surface, wherein an angle between said first side and said second sides is 89 to 91 degrees, said substrate providing an L-shaped cross-section, wherein said cross-section is non-enclosing and includes an open portion along a length direction of said substrate perpendicular to ends of said substrate;

an affixment material for securing said fused portion to said inside surface of said substrate, and a hollow housing having a rectangular cross section and a thermal conductivity of at least 50 W/m·K secured in thermal contact with said outside surface of said substrate, wherein a thermally conductive adhesive material is interposed between said outer surface of said substrate and said housing to provide said thermal contact, and wherein a minimum distance from each point on said outside surface of said substrate to said housing is substantially constant throughout said cross-section of said substrate.

16. The packaged device of claim 15, wherein said input fiber, said output fiber, and said fused-fiber comprise silica, said substrate comprises silica, and said housing comprises aluminium.

17. The packaged device of claim 15, said substrate is a monolithic substrate.

18. The packaged device of claim 15, wherein said housing provides a hermetic seal.

* * * * *

UNITED STATES PATENT AND TRADEMARK OFFICE
CERTIFICATE OF CORRECTION

| | |
|---|---|
| PATENT NO. | : 8,317,413 B2 |
| APPLICATION NO. | : 12/277484 |
| DATED | : November 27, 2012 |
| INVENTOR(S) | : Norman Edward Fisher, Toby Woodbridge and Andrew Richard Rider |

It is certified that error appears in the above-identified patent and that said Letters Patent is hereby corrected as shown below:

Title Page, Item (73), please amend the Assignee's name to be Gooch and Housego PLC.

Signed and Sealed this
Twenty-ninth Day of January, 2013

David J. Kappos
*Director of the United States Patent and Trademark Office*